United States Patent
Brown et al.

(10) Patent No.: US 9,552,350 B2
(45) Date of Patent: *Jan. 24, 2017

(54) VIRTUAL ASSISTANT CONVERSATIONS FOR AMBIGUOUS USER INPUT AND GOALS

(71) Applicant: Next IT Corporation, Spokane, WA (US)

(72) Inventors: Fred Brown, Colbert, WA (US); Mark Zartler, Garland, TX (US); Tanya M Miller, Colbert, WA (US)

(73) Assignee: Next IT Corporation, Spokane Valley, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/315,852

(22) Filed: Jun. 26, 2014

(65) Prior Publication Data

US 2014/0310005 A1    Oct. 16, 2014

Related U.S. Application Data

(63) Continuation of application No. 12/564,546, filed on Sep. 22, 2009.

(51) Int. Cl.
| | | |
|---|---|---|
| *G06F 17/30* | (2006.01) | |
| *G06F 17/27* | (2006.01) | |
| *G06F 17/28* | (2006.01) | |
| *G10L 17/22* | (2013.01) | |
| *G06N 5/02* | (2006.01) | |

(52) U.S. Cl.
CPC ......... *G06F 17/273* (2013.01); *G06F 17/2785* (2013.01); *G06F 17/28* (2013.01); *G06N 5/02* (2013.01); *G10L 17/22* (2013.01); *G06F 17/30011* (2013.01); *G06F 17/30023* (2013.01);

(Continued)

(58) Field of Classification Search
CPC .................... G06F 17/30011; G06F 17/30023; G06F 17/30569; G06F 17/30654
See application file for complete search history.

(56) References Cited

U.S. PATENT DOCUMENTS

| 5,278,980 A | 1/1994 | Pedersen et al. |
|---|---|---|
| 5,418,948 A | 5/1995 | Turtle |
| (Continued) | | |

FOREIGN PATENT DOCUMENTS

| CN | 103051669 | 4/2013 |
|---|---|---|
| WO | WO2011088053 | 7/2011 |

OTHER PUBLICATIONS

U.S. Appl. No. 13/774,381, filed Feb. 22, 2013, Fred A. Brown et al., "Interaction with a Portion of a Content Item through a Virtual Assistant," 68 pages.

(Continued)

*Primary Examiner* — Dung K Chau
(74) *Attorney, Agent, or Firm* — Lee & Hayes, PLLC

(57) ABSTRACT

Ambiguous input of a user received during an interactive session with a virtual agent may be processed. The virtual agent may be presented via a computing device to facilitate the interactive session with the user. The user may provide the ambiguous input, which is processed to determine a response to the input. The virtual agent may provide the response to the user. The virtual agent may also carry out a goal-based dialogue where a goal to be accomplished is identified. The virtual agent may prompt the user for information related to the goal.

28 Claims, 5 Drawing Sheets

(52) U.S. Cl.
CPC ... *G06F 17/30569* (2013.01); *G06F 17/30654* (2013.01)

(56) References Cited

U.S. PATENT DOCUMENTS

| | | |
|---|---|---|
| 5,535,120 A | 7/1996 | Chong et al. |
| 5,615,112 A | 3/1997 | Liu Sheng et al. |
| 5,677,835 A | 10/1997 | Carbonell et al. |
| 5,682,539 A | 10/1997 | Conrad et al. |
| 5,727,174 A | 3/1998 | Aparicio, IV et al. |
| 6,012,053 A | 1/2000 | Pant et al. |
| 6,112,177 A | 8/2000 | Cosatto et al. |
| 6,144,938 A | 11/2000 | Surace et al. |
| 6,175,829 B1 | 1/2001 | Li et al. |
| 6,353,817 B1 | 3/2002 | Jacobs et al. |
| 6,388,665 B1 | 5/2002 | Linnett et al. |
| 6,396,951 B1 | 5/2002 | Grefenstette |
| 6,401,061 B1 | 6/2002 | Zieman |
| 6,658,627 B1 | 12/2003 | Gallup et al. |
| 6,661,418 B1 | 12/2003 | McMillan et al. |
| 6,757,362 B1 | 6/2004 | Cooper et al. |
| 6,826,540 B1 | 11/2004 | Plantec et al. |
| 6,829,603 B1 * | 12/2004 | Chai et al. |
| 6,987,514 B1 | 1/2006 | Beresin et al. |
| 6,999,932 B1 | 2/2006 | Zhou |
| 7,076,430 B1 | 7/2006 | Cosatto et al. |
| 7,194,483 B1 | 3/2007 | Mohan et al. |
| 7,263,493 B1 | 8/2007 | Provost et al. |
| 7,337,158 B2 | 2/2008 | Fratkina et al. |
| 7,426,697 B2 | 9/2008 | Holecek et al. |
| 7,483,829 B2 | 1/2009 | Murakami et al. |
| 7,536,413 B1 | 5/2009 | Mohan et al. |
| 7,548,899 B1 | 6/2009 | Del Favero, Jr. et al. |
| 7,558,792 B2 | 7/2009 | Bier |
| 7,599,831 B2 | 10/2009 | Ford |
| 7,610,382 B1 | 10/2009 | Siegel |
| 7,797,146 B2 | 9/2010 | Harless et al. |
| 7,818,183 B2 | 10/2010 | Schoenberg |
| 7,912,701 B1 | 3/2011 | Gray et al. |
| 7,970,663 B2 | 6/2011 | Ganz et al. |
| 8,160,979 B1 | 4/2012 | Evans et al. |
| 8,346,563 B1 | 1/2013 | Hjelm et al. |
| 8,352,266 B2 | 1/2013 | Farmaner et al. |
| 8,401,842 B1 | 3/2013 | Ginzburg et al. |
| 8,510,276 B2 | 8/2013 | Haiby et al. |
| 8,670,979 B2 | 3/2014 | Gruber et al. |
| 8,677,377 B2 | 3/2014 | Cheyer et al. |
| 8,756,326 B1 * | 6/2014 | Elberse .................. H04L 67/02 709/219 |
| 8,762,152 B2 | 6/2014 | Bennett et al. |
| 8,943,094 B2 | 1/2015 | Brown et al. |
| 9,202,171 B2 | 12/2015 | Kuhn |
| 2001/0000356 A1 | 4/2001 | Woods |
| 2001/0033298 A1 | 10/2001 | Slotznick |
| 2001/0044751 A1 * | 11/2001 | Pugliese et al. ................ 705/26 |
| 2002/0008716 A1 | 1/2002 | Colburn et al. |
| 2002/0032591 A1 | 3/2002 | Mahaffy et al. |
| 2002/0123994 A1 | 9/2002 | Schabes et al. |
| 2002/0129031 A1 | 9/2002 | Lau et al. |
| 2002/0198885 A1 | 12/2002 | Streepy, Jr. |
| 2003/0041307 A1 | 2/2003 | Park |
| 2003/0061029 A1 | 3/2003 | Shaket |
| 2003/0088547 A1 | 5/2003 | Hammond |
| 2003/0126089 A1 | 7/2003 | Fukuoka et al. |
| 2003/0126090 A1 | 7/2003 | Fukuoka et al. |
| 2003/0142829 A1 | 7/2003 | Avigni |
| 2004/0186705 A1 | 9/2004 | Morgan et al. |
| 2005/0027694 A1 | 2/2005 | Sauermann |
| 2005/0054381 A1 | 3/2005 | Lee et al. |
| 2005/0120276 A1 | 6/2005 | Kolawa et al. |
| 2006/0004826 A1 | 1/2006 | Zartler et al. |
| 2006/0020466 A1 | 1/2006 | Cousineau et al. |
| 2006/0036430 A1 | 2/2006 | Hu |
| 2006/0037076 A1 | 2/2006 | Roy |
| 2006/0047632 A1 | 3/2006 | Zhang |
| 2006/0067352 A1 | 3/2006 | John et al. |
| 2006/0074689 A1 | 4/2006 | Cosatto et al. |
| 2006/0080107 A1 * | 4/2006 | Hill et al. ..................... 704/275 |
| 2006/0092978 A1 | 5/2006 | John et al. |
| 2006/0161414 A1 | 7/2006 | Carignano et al. |
| 2006/0253427 A1 | 11/2006 | Wu et al. |
| 2007/0043687 A1 | 2/2007 | Bodart et al. |
| 2007/0100790 A1 | 5/2007 | Cheyer et al. |
| 2007/0106670 A1 * | 5/2007 | Yoakum .................. H04L 67/14 |
| 2007/0130112 A1 | 6/2007 | Lin |
| 2007/0134631 A1 | 6/2007 | Hardy et al. |
| 2007/0156677 A1 | 7/2007 | Szabo |
| 2007/0185702 A1 | 8/2007 | Harney et al. |
| 2007/0197296 A1 | 8/2007 | Lee |
| 2007/0265533 A1 | 11/2007 | Tran |
| 2007/0294229 A1 | 12/2007 | Au |
| 2008/0005158 A1 | 1/2008 | Zartler et al. |
| 2008/0010268 A1 | 1/2008 | Liao et al. |
| 2008/0016040 A1 * | 1/2008 | Jones et al. ....................... 707/3 |
| 2008/0036756 A1 * | 2/2008 | Gaos et al. .................... 345/418 |
| 2008/0091406 A1 | 4/2008 | Baldwin et al. |
| 2008/0133444 A1 | 6/2008 | Gao et al. |
| 2008/0222734 A1 | 9/2008 | Redlich et al. |
| 2008/0235604 A1 | 9/2008 | Ebert |
| 2008/0305815 A1 | 12/2008 | McDonough |
| 2009/0006525 A1 | 1/2009 | Moore |
| 2009/0030800 A1 | 1/2009 | Grois |
| 2009/0063427 A1 | 3/2009 | Zuta et al. |
| 2009/0070103 A1 | 3/2009 | Beggelman et al. |
| 2009/0077488 A1 | 3/2009 | Ording |
| 2009/0089100 A1 | 4/2009 | Nenov et al. |
| 2009/0119095 A1 * | 5/2009 | Beggelman et al. ............. 704/9 |
| 2009/0157386 A1 * | 6/2009 | Zhou ................................ 704/9 |
| 2009/0171923 A1 | 7/2009 | Nash et al. |
| 2009/0182702 A1 | 7/2009 | Miller |
| 2009/0204677 A1 | 8/2009 | Michaelis et al. |
| 2009/0216691 A1 | 8/2009 | Borzestowski et al. |
| 2009/0225041 A1 | 9/2009 | Kida et al. |
| 2009/0227223 A1 | 9/2009 | Jenkins |
| 2009/0228264 A1 | 9/2009 | Williams et al. |
| 2009/0235356 A1 | 9/2009 | Jensen et al. |
| 2009/0248399 A1 | 10/2009 | Au |
| 2009/0271205 A1 | 10/2009 | Finn et al. |
| 2010/0005122 A1 | 1/2010 | Jackson |
| 2010/0030549 A1 | 2/2010 | Lee et al. |
| 2010/0050237 A1 | 2/2010 | Bokor et al. |
| 2010/0070448 A1 * | 3/2010 | Omoigui ........................ 706/47 |
| 2010/0070871 A1 | 3/2010 | Liesche et al. |
| 2010/0153398 A1 | 6/2010 | Miller et al. |
| 2010/0169336 A1 | 7/2010 | Eckhoff-Hornback et al. |
| 2010/0226490 A1 | 9/2010 | Schultz et al. |
| 2010/0235808 A1 | 9/2010 | Dayan et al. |
| 2010/0281012 A1 | 11/2010 | Imig et al. |
| 2011/0078105 A1 | 3/2011 | Wallace |
| 2011/0119196 A1 | 5/2011 | Ventura et al. |
| 2011/0179126 A1 | 7/2011 | Wetherell et al. |
| 2011/0213642 A1 | 9/2011 | Makar et al. |
| 2011/0288947 A1 | 11/2011 | Biran |
| 2011/0301982 A1 | 12/2011 | Green, Jr. et al. |
| 2012/0016678 A1 | 1/2012 | Gruber et al. |
| 2012/0022872 A1 | 1/2012 | Gruber et al. |
| 2012/0030553 A1 | 2/2012 | Delpha et al. |
| 2012/0110473 A1 | 5/2012 | Tseng |
| 2012/0117005 A1 | 5/2012 | Spivack |
| 2012/0221502 A1 | 8/2012 | Jerram et al. |
| 2012/0245926 A1 | 9/2012 | Montyne et al. |
| 2012/0265528 A1 | 10/2012 | Gruber et al. |
| 2012/0284040 A1 | 11/2012 | Dupin |
| 2013/0031476 A1 | 1/2013 | Coin et al. |
| 2013/0046149 A1 | 2/2013 | Gettelman et al. |
| 2013/0152092 A1 | 6/2013 | Yadgar |
| 2013/0204813 A1 | 8/2013 | Master et al. |
| 2013/0254139 A1 | 9/2013 | Lei |
| 2013/0262467 A1 | 10/2013 | Zhang et al. |
| 2013/0275875 A1 | 10/2013 | Gruber et al. |
| 2013/0283168 A1 | 10/2013 | Brown et al. |
| 2014/0029734 A1 | 1/2014 | Kim et al. |
| 2014/0040748 A1 | 2/2014 | Lemay et al. |
| 2014/0047001 A1 | 2/2014 | Phillips et al. |

(56) References Cited

U.S. PATENT DOCUMENTS

| | | |
|---|---|---|
| 2014/0074454 A1 | 3/2014 | Brown et al. |
| 2014/0115456 A1 | 4/2014 | White et al. |
| 2014/0164476 A1 | 6/2014 | Thomson |
| 2014/0164508 A1 | 6/2014 | Lynch et al. |
| 2014/0181741 A1 | 6/2014 | Apacible et al. |
| 2014/0244266 A1 | 8/2014 | Brown et al. |
| 2014/0244712 A1 | 8/2014 | Walters et al. |
| 2014/0245140 A1 | 8/2014 | Brown et al. |
| 2014/0317502 A1 | 10/2014 | Brown et al. |
| 2014/0337048 A1 | 11/2014 | Brown et al. |
| 2014/0343924 A1 | 11/2014 | Brown et al. |
| 2014/0343928 A1 | 11/2014 | Brown et al. |
| 2014/0365223 A1 | 12/2014 | Brown et al. |
| 2014/0365407 A1 | 12/2014 | Brown et al. |
| 2015/0066817 A1 | 3/2015 | Slayton et al. |
| 2015/0185996 A1 | 7/2015 | Brown et al. |
| 2015/0186154 A1 | 7/2015 | Brown et al. |
| 2015/0186155 A1 | 7/2015 | Brown et al. |
| 2015/0186156 A1 | 7/2015 | Brown et al. |
| 2016/0110071 A1 | 4/2016 | Brown et al. |

OTHER PUBLICATIONS

U.S. Appl. No. 13/774,519, filed Feb. 22, 2013, Fred A. Brown et al, "Virtual Assistant Transfer between Smart Devices," 65 pages.
Final Office Action for U.S. Appl. No. 12/014,229, mailed on Nov. 25, 2013, Tanya M. Miller, "Active Lab", 15 pages.
Final Office Action for U.S. Appl. No. 12/636,571, mailed on Nov. 7, 2013, Tanya Miller, "Leveraging Concepts With Information Retrieval Techniques and Knowledge Bases", 31 pages.
Non-Final Office Action for U.S. Appl. No. 12/564,546, mailed on Dec. 21, 2011, Tanya Miller et al., "Apparatus, System, and Method for Natural Language Processing", 12 pages.
Final Office Action for U.S. Appl. No. 12/564,546, mailed on Feb. 26, 2013, Tanya Miller et al., "Apparatus, System, and Method for Natural Language Processing", 15 pages.
Final Office Action for U.S. Appl. No. 13/341,261, mailed on Feb. 27, 2014, Fred A. Brown, "Providing Variable Responses in a Virtual-Assistant Environment", 32 pages.
Non-Final Office Action for U.S. Appl. No. 12/014,229, mailed on Mar. 15, 2013, Tanya M. Miller, "Active Lab", 14 pages.
Non-Final Office Action for U.S. Appl. No. 12/636,571, mailed on Apr. 12, 2013, Tanya Miller et al., "Leveraging Concepts With Information Retrieval Techniques and Knowledge Bases", 31 pages.
Non-Final Office Action for U.S. Appl. No. 12/564,546, mailed on Jun. 12, 2013, Tanya Miller et al., "Apparatus, System, and Method for Natural Language Processing", 18 pages.
Office action for U.S. Appl. No. 13/341,261, mailed on Aug. 14, 2013, Brown et al., "Providing Variable Responses in a Virtual-Assistant Environment", 22 pages.
Office action for U.S. Appl. No. 14/302,096, mailed on Oct. 8, 2014, Brown, "Active Lab", 27 pages.
Office action for U.S. Appl. No. 12/636,571, mailed on Aug. 14, 2014, Miller et al., "Leveraging Concepts With Information Retrieval Techniques and Knowledge Bases", 35 pages.
Office action for U.S. Appl. No. 14/467,221, mailed on Oct. 9, 2014, Brown, "Context-Based Virtual Assistant Conversations", 24 pages.
"5 wearable electronic phones", retrieved on Feb. 13, 2015 at <<http://limcorp.net/2009/5-wearable-electronic-phones>>, 12 pages.
"AskJennMediaCoverage", retrieved on Nov. 12, 2014, 76 pages.
Cassell, et al., "Embodied Conversational Agents", MIT Press, 2000, pp. 272 and 275.
Office Action for U.S. Appl. No. 14/467,715, mailed on Oct. 1, 2014, Fred Brown, "Virtual Assistant Conversations", 14 pages.
Office Action for U.S. Appl. No. 13/341,261, mailed on Nov. 6, 2014, Fred A. Brown, "Providing Variable Responses in a Virtual-Assistant Environment", 26 pages.
Final Office Action for U.S. Appl. No. 14/293,673, mailed on Dec. 4, 2014, Fred A. Brown, "Virtual Assistant Conversations", 22 pages.
Office Action for U.S. Appl. No. 14/451,009, mailed on Dec. 4, 2014, Fred Brown, "Wearable-Based Virtual Agents", 9 pages.
Office Action for U.S. Appl. No. 12/014,229, mailed on Feb. 13, 2015, Tanya M. Miller, "Active Lab", 16 pages.
Office action for U.S. Appl. No. 14/293,586, mailed on Feb. 17, 2015, Brown et al., "Virtual Assistant Team Customization", 11 pages.
Office action for U.S. Appl. No. 14/467,221, mailed on Feb. 17, 2015, Brown et al., "Context-Based Virtual Assistant Conversations", 5 pages.
Final Office Action for U.S. Appl. No. 14/293,529, mailed on Feb. 23, 2015, Fred A. Brown, "Virtual Assistant Team Identification", 17 pages.
Office action for U.S. Appl. No. 14/293,529, mailed on Sep. 10, 2014, Brown et al., "Virtual Assistant Team Identification", 13 pages.
Office action for U.S. Appl. No. 14/293,619, mailed on Sep. 8, 2014, Brown et al., "Virtual Assistant Acquisitions and Training", 15 pages.
Office action for U.S. Appl. No. 14/293,673, mailed on Sep. 8, 2014, Riegler et al., "Virtual Assistant Conversations", 22 pages.
Office Action for U.S. Appl. No. 14/302,096, mailed on Jan. 12, 2015, Fred Brown, "Active Lab", 4 pages.
PCT Search Report and Written Opinion mailed Nov. 12, 2014 for PCT Application No. PCT/US14/31047, 14 Pages.
"The Armys Robot Recruiter", Transcript from New York Public Radio, Aug. 8, 2014, 3 pages.
"Undercover Virtual Agent Article", KOMO News, retrieved Nov. 12, 2014, 2 pages.
Final Office Action for U.S. Appl. No. 14/293,586, mailed on Jul. 24, 2015, Fred A. Brown, "Virtual Assistant Team Customization", 14 pages.
Office Action for U.S. Appl. No. 14/293,673, mailed on Jul. 24, 2015, Fred A. Brown, "Virtual Assistant Conversations", 25 pages.
Final Office Action for U.S. Appl. No. 14/302,096, mailed on Jul. 29, 2015, Fred Brown, "Active Lab", 7 pages.
"Case Study With Alme, Alaska Airlines soars", retrieved on Apr. 10, 2015 at <<http://www.nextit.com/media/downloads/Case-study-Alaska-Air.pdf>>, 3 pages.
"Frost & Sullivan Commends Next IT for Leading the Virtual Agent Applications Industry in Competitive Strategy Innovation", Frost & Sullivan, Dec. 18, 2014, 5 pages.
"Meet Jenn, Your Virtual Assistant at alaskaair.com", retrieved on Apr. 13, 2015 at <<http://www.alaskaair.com/content/about-us/site-info/ask-jenn.aspx>>, 1 page.
Final Office Action for U.S. Appl. No. 14/293,619, mailed on Apr. 13, 2015, Fred A. Brown, "Virtual Assistant Acquisitions and Training", 17 pages.
Final Office Action for U.S. Appl. No. 14/467,715, mailed on Apr. 16, 2015, Fred Brown, "Virtual Assistant Conversations", 5 pages.
Office action for U.S. Appl. No. 13/341,261, mailed on May 21, 2015, Brown et al., "Providing Variable Responses in a Virtual-Assistant Environment", 30 pages.
Final Office Action for U.S. Appl. No. 14/451,009, mailed on May 21, 2015, Fred Brown, "Wearable-Based Virtual Agents", 10 pages.
Final Office Action for U.S. Appl. No. 12/636,571, mailed on Jun. 12, 2015, Tanya Miller, "Leveraging Concepts With Information Retrieval Techniques and Knowledge Bases", 37 pages.
Final Office Action for U.S. Appl. No. 14/293,529, mailed on Jun. 15, 2015, Fred A. Brown, "Virtual Assistant Team Identification", 16 pages.
"SGT STAR Wins Intelligent Assistant Award", San Francisco, Calif (PRWEB) Sep. 24, 2014, PRWEB Online Visibility from Vocus, 2 pages.
"TAM", Case Study Meet Juli—TAM Airlines' most famous new hire, Next IT Corporation, May 19, 2015, 2 pages.
PCT Search Report and Written Opinion mailed Sep. 2, 2015 for PCT Application No. PCT/US15/33594, 9 pages.

(56) References Cited

OTHER PUBLICATIONS

Office Action for U.S. Appl. No. 14/293,619, mailed on Aug. 13, 2015, Fred A. Brown, "Virtual Assistant Acquisitions and Training", 17 pages.
Office Action for U.S. Appl. No. 14/293,529, mailed on Oct. 1, 2015, Fred A. Brown, "Virtual Assistant Team Identification", 18 pages.
Office Action for U.S. Appl. No. 13/341,261, mailed on Sep. 23, 2015, Fred A. Brown, "Providing Variable Responses in a Virtual-Assistant Environment", 26 pages.
Pandorabots Inc., "AIML Targeting: Supervised Learning for Bots", uploaded on Oct. 29, 2009, at https:// www.youtube.com/watch?v=aGe30NTVDOk.
Office action for U.S. Appl. No. 14/293,673, mailed on Jan. 15, 2016, Brown et al., "Virtual Assistant Conversations", 29 pages.
Office action for U.S. Appl. No. 14/451,009, mailed on Jan. 5, 2016, Brown et al., "Wearable-Based Virtual Agents", 10 pages.
Office action for U.S. Appl. No. 14/467,221, mailed on Feb. 18, 2016, Brown et al., "Context-Based Virtual Assistant Conversations", 14 pages.
Office action for U.S. Appl. No. 14/293,619, mailed on Feb. 26, 2016, Brown et al., "Virtual Assistant Acquisitions and Training", 16 pages.
Office action for U.S. Appl. No. 14/293,529, mailed on Mar. 17, 2016, Brown et al., "Virtual Assistant Team Identification", 19 pages.
Office action for U.S. Appl. No. 14/293,586, mailed on Mar. 17, 2016, Brown et al., "Virtual Assistant Team Customization", 13 pages.
Office action for U.S. Appl. No. 12/636,571, mailed on Mar. 24, 2016, Miller et al., "Leveraging Concepts With Information Retrieval Techniques and Knowledge Bases", 31 pages.
Office action for U.S. Appl. No. 13/341,261, mailed on Mar. 24, 2016, Brown et al., "Providing Variable Responses in a Virtual-Assistant Environment", 30 pages.
Office action for U.S. Appl. No. 12/014,229, mailed on Nov. 19, 2015, Inventor #1, "Active Lab", 8 pages.
Office action for U.S. Appl. No. 14/446,153, mailed on Mar. 25, 2016 Brown et al., "Conversational Virtual Healthcare Assistant", 7 pages.
Final Office Action for U.S. Appl. No. 14/446,153, mailed on Apr. 29, 2015, Fred a. Brown, "Conversational Virtual Healthcare Assistant", 9 pages.
Final Office Action for U.S. Appl. No. 13/449,927, mailed on Apr. 9, 2015, Fred A. Brown, "Conversation User Interface", 35 pages.
Office action for U.S. Appl. No. 14/467,715, mailed on May 18, 2016, Brown et al., "Virtual Assistant Conversations", 14 pages.
Office action for U.S. Appl. No. 14/451,009, mailed on Jul. 15, 2016, Brown et al., "Wearable-Based Virtual Agents", 6 pages.
Office Action for U.S. Appl. No. 13/607,414, mailed on Jul. 21, 2015, Fred a. Brown, "Conversational Virtual Healthcare Assistant", 25 pages.
Office Action for U.S. Appl. No. 13/449,927, mailed on Aug. 15, 2014, Fred A. Brown, "Conversation User Interface", 29 pages.
Office Action for U.S. Appl. No. 14/446,153, mailed on Sep. 18, 2015, Fred A. Brown, "Conversational Virtual Healthcare Assistant", 11 pages.
Office Action for U.S. Appl. No. 14/446,153, mailed on Sep. 26, 2014, Fred A. Brown, "Conversational Virtual Healthcare Assistant", 7 pages.
Office action for U.S. Appl. No. 14/446,153, mailed on Aug. 25, 2016, Brown et al., "Conversational Virtual Healthcare Assistant", 13 pages.
Office action for U.S. Appl. No. 14/293,529, mailed on Aug. 31, 2016, Brown et al., "Virtual Assistant Team Identification", 18 pages.

\* cited by examiner

VIRTUAL ASSISTANT CONVERSATIONS FOR AMBIGUOUS USER INPUT AND GOALS

RELATED APPLICATIONS

This Application claims priority to and is a continuation of U.S. patent application Ser. No. 12/564,546, filed Sep. 22, 2009, which is incorporated herein by reference.

BACKGROUND

Traditional information retrieval (IR) techniques typically rely on vocabulary term matching when searching through documents to identify documents for a response. Specifically, these IR techniques typically sort through large numbers of documents (a "knowledge base") to identify those documents having vocabulary words and/or phrases that match a user's typed input. As a result, documents that are potentially valuable to the user, and relevant to their input, but that do not happen to have matching vocabulary words and/or phrases often are neither retrieved nor returned to the user. These are referred to as "missed" results. Conversely, documents that are not of value to the user, but that happen to have matching vocabulary words and/or phrases, are often retrieved and/or returned to the user. These are "false alarm" results. One aspect of an IR system is to reduce both the number of misses and the number of false alarms.

BRIEF DESCRIPTION OF THE DRAWINGS

The same numbers are used throughout the drawings to reference like features.

DETAILED DESCRIPTION

Figure 1:
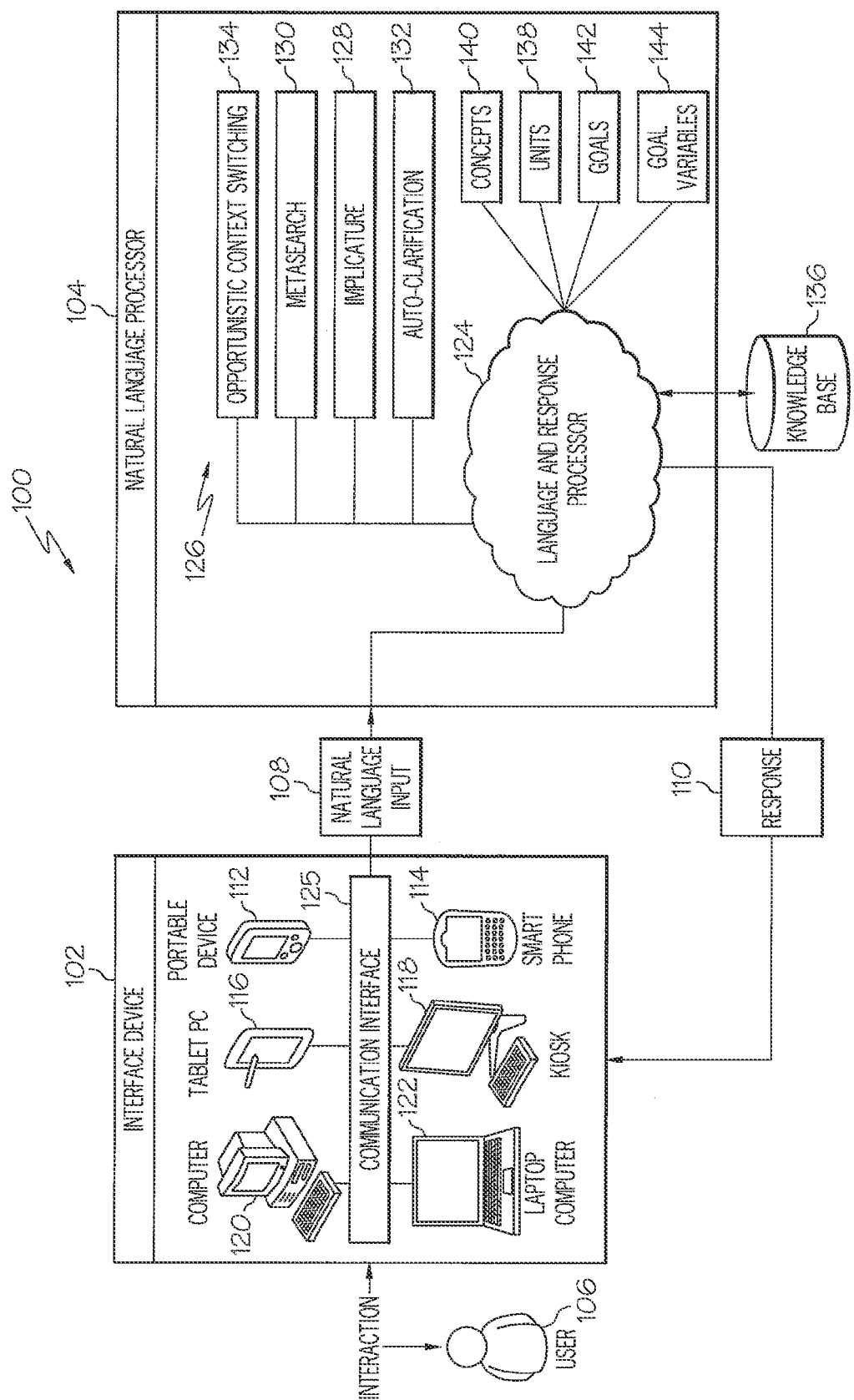
FIG. 1 illustrates a block diagram of a natural language processing system.

Various embodiments may be generally directed to information retrieval techniques for reducing both the number of misses and the number of false alarms when searching for documents in a knowledge base. Various embodiments may be generally directed to searching and retrieving documents based on a natural language input. Such natural language processing techniques provide specific answers to queries submitted by a user while avoiding the need for the user to sort through a set of search results such as might be provided by standard keyword-based searches. Some embodiments may be particularly directed to natural language processing techniques for improving the efficiency of accessing knowledge bases.

Knowledge bases provide a way in which a suite of intelligent applications, referred herein as ActiveAgent, can provide users with specific pre-defined responses. ActiveAgent can take the form of a virtual expert or agent that understands phrases inputted by a user and provides a response to the user. Knowledge bases can cover the entire scope of information that ActiveAgent uses, along with all of its capabilities. In at least some embodiments, knowledge base files themselves are written in a programming language known as FPML (Functional Presence Markup Language), a language similar to XML. This includes master FPML files, optional FPML files, lex files, and other auxiliary files, such as, input files, dictionary files, other text files to impact scoring, and contextual awareness files, for example. For additional information on FPML, the reader is referred to commonly owned U.S. patent application Ser. No. 10/839,425 titled "DATA DISAMBIGUATION SYSTEMS AND METHODS" and U.S. patent application Ser. No. 11/169,142 titled "METHODS AND SYSTEMS FOR ENFORCING NETWORK AND COMPUTER USE POLICY," the disclosures of which are incorporated herein by reference in their entirety.

Various embodiments may be directed to "implicature" based natural language processing techniques for acquiring and maintaining concepts during an interactive session between a natural language processing system and the user for the purpose of resolving "ambiguous" input patterns provided in a natural language input.

Various embodiments may be directed to "goal" based natural language processing techniques for providing an abstract representation of a user's intention based on the content of the natural language input.

Various embodiments may be directed to "meta search" based natural language processing techniques for providing additional related information in response to a pattern provided in a natural language input submitted by the user. The m to search based natural language processing technique enables the natural language processing system to provide multiple responses to the user rather than providing only a single response to the user, e.g., the "meta search" provides expanded search results in addition to the response that is associated with a unit whose natural language input pattern was matched by the user's input pattern.

Various embodiments may be directed to "auto-clarification" based natural language processing techniques for resolving ambiguities that arise when the concepts found in a pattern in the natural language input submitted by the user are not sufficient for the natural language processing system to identify a single matching unit upon which to base a response to the user.

Various embodiments may comprise a combination of two or more of the above embodiments. Various other embodiments are described and claimed and may provide various advantages associated with natural language processing, which will be described with reference to specific embodiments below.

FIG. 1 illustrates a block diagram of a natural language processing system 100. In the illustrated embodiment shown in FIG. 1, the natural language processing system 100 may include an interface device 102 and a natural language processor 104 coupled by a communication interface 125. A user 106 interacts with the interface device 102 to submit the natural language input 108 to the natural language processor 104 via the communication interface 125. In response to the natural language input 108, the natural language processor 104 provides a response 110 to the user 106 via the interface device 102.

In one embodiment, the interface device 102 may be implemented as a handheld portable device 112 such as a personal digital assistant (PDA), mobile telephone, sometimes referred to as a smart phone 114, tablet personal computer 116 (PC), kiosk 118, desktop computer 120, or laptop computer 122, or any combination thereof. Examples of smart phones 114 include, for example, Palm® products such as Palm® Treo® smart phones, Blackberry® smart phones, and the like. Although some embodiments of the interface device 102 may be described with a mobile or fixed computing device implemented as a smart phone, personal digital assistant, laptop, desktop computer by way of example, it may be appreciated that the embodiments are not limited in this context. For example, a mobile computing device may comprise, or be implemented as, any type of wireless device, mobile station, or portable computing device with a self-contained power source (e.g., battery) such as the laptop computer 122, ultra-laptop computer, PDA, cellular telephone, combination cellular telephone/PDA, mobile unit, subscriber station, user terminal, portable computer, handheld computer 116, palmtop computer, wearable computer, media player, pager, messaging device, data communication device, and so forth. A fixed computing device, for example, may be implemented as a desk top computer, workstation, client/server computer, and so forth. In one embodiment, the interface device 102 may be implemented as a conventional landline telephone for voice input and/or speech recognition applications, for example.

The interface device 102 may provide voice and/or data communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wide-band CDMA (WCDMA), CDMA-2000, Universal Mobile Telephone System (UMTS) systems, and so forth.

The interface device 102 may be configured as a mobile computing device to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.1a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The mobile computing device also may utilize different types of shorter range wireless systems, such as a Bluetooth system operating in accordance with the Bluetooth Special Interest Group (SIG) series of protocols, including Bluetooth Specification versions v1.O, v1.1, v1.2, v1.O, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

The interface device 102 is configured to couple to the communications interface 125. The interface device 102 may form part of a wired communications system, a wireless communications system, or a combination of both. For example, the interface device 102 may be configured to communicate information over one or more types of wired communication links such as a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The interface device 102 may be arranged to communicate information over one or more types of wireless communication links such as a radio channel, satellite channel, television channel, broadcast channel infrared channel, radio-frequency (RF) channel, WiFi channel, a portion of the RF spectrum, and/or one or more licensed or license-free frequency bands. In wireless implementations, the interface device 102 may comprise one more interfaces and/or components for wireless communication such as one or more transmitters, receivers, transceivers, amplifiers, filters, control logic, wireless network interface cards (WNICs), antennas, and so forth.

In one embodiment, the communication interface 125 may be implemented as a leased line point-to-point connection between the interface device 102 and the natural language processor 104 over a Local Area Network (LAN). In another embodiment, the communication interface 125 may be implemented as a circuit switched dedicated circuit path created between the interface device 102 and the natural language processor 104. In another embodiment, the communication interface 125 may be implemented as a packet switched device for transporting packets via a shared single point-to-point or point-to-multipoint link across a carrier internetwork. Variable length packets may be transmitted over Permanent Virtual Circuits (PVC) or Switched Virtual Circuits (SVC). In yet another embodiment, the communication interface 125 may be implemented as a cell relay similar to packet switching, but using fixed length cells instead of variable length packets. Data may be divided into fixed-length cells and then transported across virtual circuits.

In one embodiment, the natural language processor 104 may be implemented as a general purpose or dedicated computer system configured to execute a core of specific algorithms, functions, and/or software applications to provide natural language processing functionality. The natural language processor 104 may comprise a computer system, or network of computer systems, referred to herein as a language and response processor 124, designated for executing (e.g., running) one or more than one specific natural language software application 126 to provide natural language processing in response to the natural language input 108 submitted by the user 106 via the interface device 102. Each of the specific natural language software applications 126 may be representative of a particular kind of natural language processing algorithm.

In various embodiments, the natural language software applications 126 may include without limitation an implicature module 128 for acquiring and maintaining concepts during an interactive session for the purpose of resolving "ambiguous" input patterns, a meta search module 130 for providing additional related information in response to a user's input pattern, an auto-clarification module 132 for resolving ambiguities that arise when the concepts found in a user's input pattern are not sufficient for the system to identify a single matching unit, and an opportunistic context switching module 134 for providing an abstract representation of a user's intention when the user does not respond to a prompt with the information that was requested and instead asks a question that is unrelated to the current information retrieval goal. The opportunistic context switching module 134 is described more particularly in FIG. 2. Specific implementations of each of these software applications 126 are subsequently discussed in accordance with the described embodiments.

In one embodiment, the language and response processor 124 may comprise an information retrieval engine (IRE) component to retrieve and return relevant documents in the response 110 based on the natural language input 108 submitted by the user 106. In one embodiment, the IRE may utilize concepts techniques, as described in commonly owned U.S. Provisional Patent Application Ser. No. 61/122, 203, titled "LEVERAGING CONCEPTS WITH INFORMATION RETRIEVAL TECHNIQUES AND KNOWLEDGE BASES," which is incorporated herein by reference in its entirety. The IRE may be implemented as a search engine designed to search for information on a variety of networks or knowledge bases 136. The results of the search may be presented in the response 110 as a list commonly called search results. The information in the response 110 may comprise web pages, images, information, documents, and/or other types of files collectively referred throughout the remainder of this specification as "documents." In various embodiments, the IRE may be maintained by human editors, may operate algorithmically, or may be implemented as a combination of algorithmic and human input. The knowledge base 136 may be contained within the natural language processor 104 or may be coupled thereto over one or more networks.

The natural language input 108 entered by the user 106 may comprise one or more than one phrase. The natural language processor 104 attributes zero or more concepts to a phrase within the natural language input 108 entered by the user 106. The natural language processor 104 can index (i.e., build an index or indices) documents in the knowledge base 136 based on the respective concept(s) attributed to the phrase in the natural language input 108. In this manner, the natural language processor 104 is able to relatively quickly provide the response 110 to the user 106 by querying the index and returning/retrieving any documents with one or more concepts matching those attributed to the phrase within the natural language input 108.

In one embodiment, the knowledge base 136 may comprise a collection of documents (e.g., web pages, printer document format [PDF] files, images, information, and other types of files) that contain specific elements or components (e.g., pieces) of the information that the user 108 may wish to access. These individual elements or components of the information are referred to as the responses 110. The knowledge base 136 may contain a very large number of responses 110.

A unit 138 is a pairing of patterns of words, terms, concepts, or phrases provided in the natural language input 108 with a suitable response 110 from the knowledge base 136 that should trigger that response 110. The unit 138 pairings associated with any given response 110 may comprise many patterns contained in the natural language input 108 that should elicit that response 110. For example, the response 110 "Our savings accounts are free, but do require that you maintain a balance of $300," from the natural language processor 104, may be the appropriate response 110 for any one of the following patterns contained in the natural language input 108:

How much does it cost to have a savings account?
What's the price of a savings account?
$$ of a savings account?
Saving's accounts: cost?
Do I have to pay for savings accounts?
What are the restrictions of a savings account?
Is there a minimum balance I have to maintain to have a savings account?
How much is a savings account?

A concept 140 is a technique employed by the natural language processor 104 to return and/or retrieve more relevant documents in a response 110. As previously discussed, the natural language processor 104 may employ techniques associated with leveraging concepts. In this context, the concept 140 may be defined as a breakdown of critical ideas contained in phrases in the natural language input 108. Zero or more concepts 140 can be attributed to a phrase entered by the user 106 when the natural language input 108 is received by the natural language processor 104. One or more concepts 140 can also be attributed to individual documents available to the natural language processor 104 for responding to the user's phrase in the natural language input 108. The natural language processor 104 can index the documents (i.e., build an index or indices) based on the respective concept(s) 140 in order to respond relatively quickly to the phrase in the natural language input 108 submitted by the user 106. The natural language processor 104 queries the index and returns and/or retrieves any documents having one or more concepts 140 matching those attributed to the phrase in the natural language input 108.

A concept 140 may comprise various components. As previously discussed, the concept 140 may be defined as a breakdown of critical ideas. In at least some implementations, the concept 140 comprises patterns of one or more components. Although these components may vary based on specific implementations, a concept 140 may comprise a vocabulary component ("Vocab"), a helper term component ("Helper Term"), and/or a building block component ("Building Block"). As subsequently described, a concept 140 may comprise each of these components alone or in combination. Various examples of "Vocabs," "Helper Terms," and/or "Building Blocks" are described individually below. In addition, some concepts 140 also may comprise one or more wild cards ("Wild Cards"), also described below. A concept 140 is considered to be triggered (or "hit") when a phrase in the natural language input 108 received by the natural language processor 104 completely matches at least one of the patterns associated with a concept 140.

A vocabulary component of a concept 140 (e.g., Vocab) comprises a grouping or list of unambiguous synonyms and misspellings. The name of a particular grouping or list of synonyms and misspellings of a vocabulary component may be identified as a vocabulary term ("Vocab Term"). For convenience and clarity, Vocab Terms often end with the suffix "vocab." The particular groupings of unambiguous synonyms and misspellings associated with the Vocab Terms: "AccountVocab," "PriceVocab," and "BankVocab" are described below as illustrative examples.

For example, the Vocab Term "AccountVocab" may comprise a list of the following particular groupings of unambiguous synonyms and misspellings of the word "account":

AccountVocab
  Account
  Accounts
  Accts
  Account's

As another example, the Vocab Term "PriceVocab" may comprise a list of the following particular groupings of unambiguous synonyms and misspellings of the word "price":

PriceVocab
  Price
  Prices
  Prise
  Prises
  Cost
  Costs
  Cost's

In the PriceVocab example above, the word "cost" is included in the Vocab Term because a user 106 would most likely consider the vocabulary terms/words "price" and "cost" to be synonymous.

As a further example, the Vocab Term "BankVocab" may comprise a list of the following particular groupings of unambiguous synonyms and misspellings of the word "bank":

BankVocab
  Bank
  Banks
  Bank's
  Lender
  Lenders
  Credit union
  Credit Unions In the BankVocab example above, the user 106 would most likely consider the vocabulary terms/words "bank," "lender," and "credit union" to be synonymous.

Vocabulary terms/words that do not have unambiguous synonyms but nevertheless function substantially in the same manner as vocabulary terms/words are referred to as Helper Terms. A typical Helper Term does not have an associated vocabulary component (Vocab) like a concept 140 does. Helper Terms consist primarily of conjunctions, such as, for example:

and
  is
  for
  the

Building Blocks are a list of either Vocab/Helper Terms or a list of concepts 140 that may be useful when categorized together. For example, the Building Block "Anatomy (Vocab Building Block)" may be defined using the following vocabulary terms, where each of these vocabulary terms would comprise a list of particular groupings of unambiguous synonyms and misspellings of various words associated with the word "anatomy":

armvocab
  legvocab
  headvocab
  shouldervocab
  feetvocab

Once the Vocab Terms are bundled together they can be used in a concept 140 pattern. The Anatomy Building Block also includes Vocab Terms, which include unambiguous synonyms and misspellings associated with the word "anatomy." The following example illustrates the use of an Anatomy Building Block that contains five Vocab Terms and reduces the number of concept patterns from ten to two:

* Anatomy (Building Block) surgeryvocab *
  * brokenvocab myvocab Anatomy (Building Block)*

The following example of a Vocab Building Block named "Types of Accounts (concept Building Block)" or simply Accounts Building Block may be used to reduce the number of necessary concept patterns.

Savings Accounts
  Checking Accounts
  Money Market Accounts
  Investment Accounts
  Mortgage Accounts Wild Cards function as placeholders within Concepts for any random word or words.

Concepts 140 may be created or built through any suitable means and this can be performed manually, automatically, or any combination thereof. As noted above, a concept 140 is usually made up of components comprising patterns of Vocabs, Helper Terms, and Building Blocks (and occasionally Wild Cards) listed within the concept 140. For example, the above concept Building Block "types of accounts" may be all or part of a pattern making up the concept "account types." Additional examples of patterns that may make up a savings account concept, where the Helper Term "for" does not end with the suffix "vocab," include:

* savingsvocab accountvocab *
  * accountvocab for savingsvocab *
  * interestvocab bearingvocab accountvocab *

Additionally, patterns may include, without limitation, dictionary text files, tabular text data files, regular expressions, lex types and other constructs to impact scoring, and contextual awareness, for example.

In concepts 140, both order and proximity are important, both of which are optional when creating any given pattern. To select a particular order for a pattern of a concept, the pattern should specify a particular order (i.e., ordering) with respect to two or more of the pattern's Vocab, Helper Terms, and/or Building Blocks. For example, with respect to order, a pattern of a concept specifying the order "savings account" is different from the pattern of a concept specifying the order "account savings." To select a particular proximity for a pattern of a concept 140, the pattern should specify the proximity of two or more of the pattern's Vocab, Helper Terms, and/or Building Blocks. A pattern of a concept 140 specifying that the terms "savings" and "account" are to be positioned next to one another would be different from the pattern of a concept 140 with the phrase "savings in my account."

It will be appreciated that for most patterns in the natural language input 108, it is advantageous to specify both an order and a proximity for a pattern of a concept 140. In the above example, a pattern of a concept 140 "Savings Account" in the natural language input 108 has a very different meaning than the patterns of concepts "Account Savings" and "Savings in my Account." Concepts 140 also have their own associated test questions for the purposes of testing. Examples of test questions that the user 06 may include in the natural language input 108 for the pattern of a concept 140 "Savings Account" may comprise:

Do you have savings accounts at your bank?
  What's a savings account?
  Do you have any interest bearing accounts?

A unit 138, among other features described herein, matches concepts 140 extracted from the natural language input 108. A unit 138 is comprised of one or many individual units where each unit generates a single response 110. The concept 140 patterns for an individual unit are specified with no regard to order. This improves the likelihood of a correct answer and limits the number of individual units 138 in the FPML knowledge base 136 and allows autoclarification.

It will be appreciated that a single natural language input 108 from the user 106 may not always be sufficient for the knowledge base 136 to provide a meaningful response 110. In such cases, the natural language processor 104 may prompt the user 106 to provide additional information. This "back and forth" interactive dialog between the natural language processor 104 and the user 106 may continue until there is sufficient information collected from the user 106 to enable the natural language processor 104 to provide a suitable response 110.

As previously discussed, various embodiments may be directed to "implicature" based natural language processing techniques for acquiring and maintaining concepts during an interactive session between the natural language processor 104 and the user 106 for the purpose of resolving "ambiguous" input patterns provided in the natural language input 108 by the user 106. The implicature 128 module (e.g., software application) acquires and maintains the concepts 140 during an interactive session between the natural language processor 104 and the user 106 for the purpose of resolving "ambiguous" input patterns entered by the user 106. For example, Query 1: I would like a ticket to New York Query 2: How much does it cost?

After processing Query 1, the natural language processor 104 stores in memory the word "ticket" as the value of the concept 140 "user's desire" so that when the system sees the word "it" in Query 2 it will be able to associate it to the word "ticket." Such ambiguities often arise with the use of pronouns such as "he," "she," and "it," and with other words/phrases as in "Tell me about the first one," or "I'll take the second option."

As another example, consider the following interaction between the user 106 and the natural language processor 104 that provides information about the United States (US) Army:

User: What is AIT?

System: Advanced Individual Training is Army training specifically designed to maximize the potential of each soldier.

User: Where is it?

[The concept "AIT" is carried over]

System: Advanced Individual Training takes place all over the world and depends on the type of training.

User: What is BCT? [nothing carried over]

System: Basic Combat Training is where civilians learn to be soldiers. It is tough but rewarding work.

User: Where is AIT? [nothing carried over]

System: Advanced Individual Training takes place all over the world and depends on the type of training.

User: BCT?

[The concept "where" is carried over]

System: Basic Combat Training takes place in Alabama or Texas.

A goal 142 is an abstract representation of an intention of either the user 106 or the natural language processor 104. For example, consider the fictional airlines "Next Airlines." The user 106 may navigate to the Next Airlines' web site with the intention (i.e., the "goal") of booking air travel. In order to achieve the goal 142 (e.g., booking air travel), certain pieces of information are required. For example, if the goal 142 is to book air travel, it is necessary to obtain the departure city, the destination city, days of travel, and so on, from the user 106. Thus the goal 142 has "slots" of information or goal variables 144 that must be filled in before the natural language processor 104 can provide the user 106 with the response 110, thus completing the goal 142. It will be appreciated that the "slots" referring to the goal variables 144 tracked during an interactive session are variable storage memory locations allocated by the natural language processor 104 as needed.

A goal 142 can extract multiple goal variables 144 from a single natural language input 108 or through multiple inputs. The order that the information is provided does not matter to the Goal 142. In other words, a goal 142 is able to extract multiple goal variables 144 when the user 106 supplies more than one piece of information without regard to the ordering of information. For example, a goal 142 may extract departure city, destination city, and day of the week with a single user input 106 even when the sentences are structured differently, such as the sentences below:

User: I would like to fly from Seattle to Spokane on Monday

User: On Monday, I would like to fly to Seattle from Spokane

If the user 106 does not provide, in a single natural language input 108 pattern, all of the slot information, e.g., goal variables 144, needed to complete the goal 142, then the natural language processor 104 will enter into, initiate, an interactive dialog with the user 106 to obtain the missing information and the prompts presented to the user 106 by the natural language processor 104 will be based on the empty slots, which represent goal variables 144 with unknown values.

Figure 2:
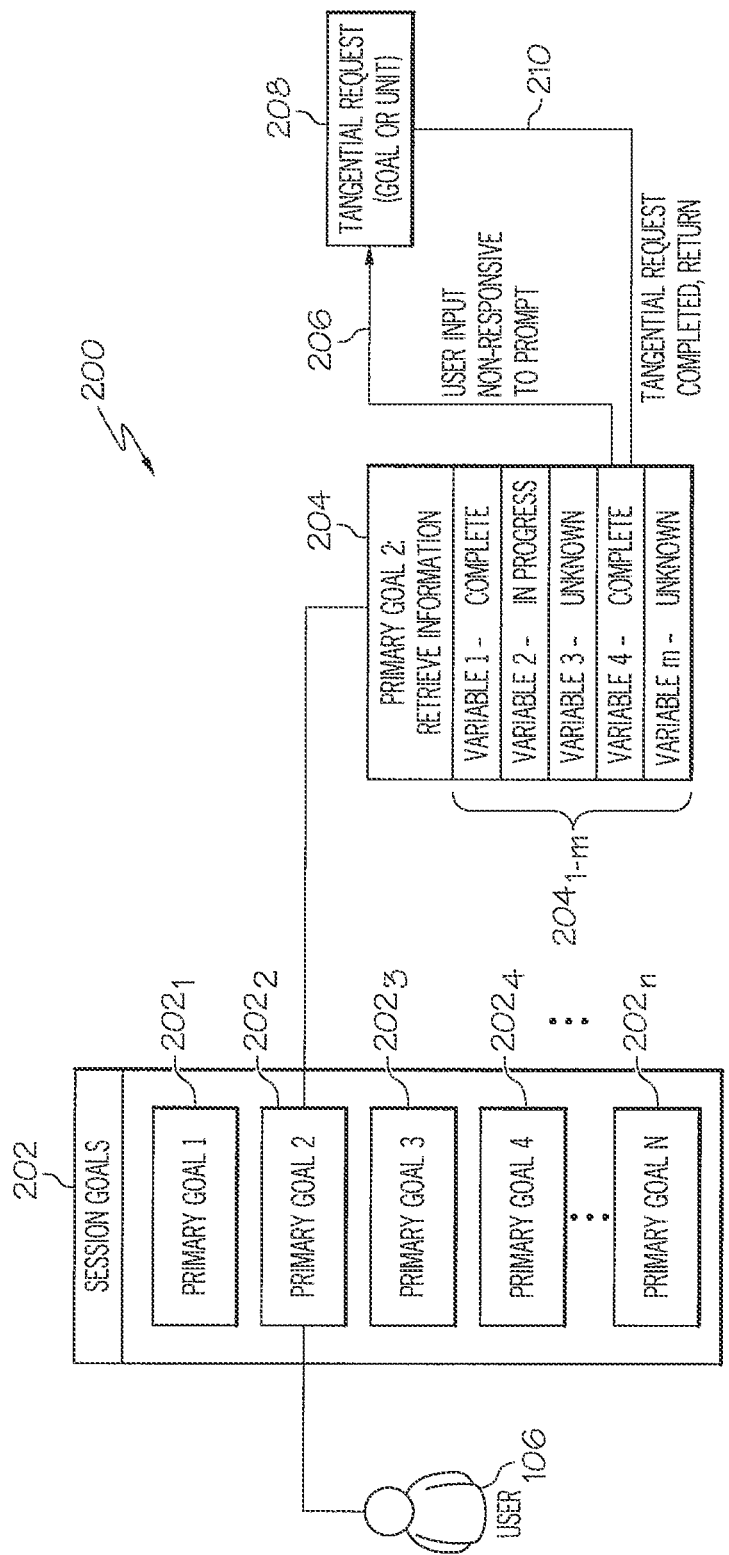
FIG. 2 illustrates a diagram of one embodiment of an opportunistic context switching module.

A goal 142 may comprise a portion of the overall knowledge base 136. When a goal 142 is active, the natural language processor 104 preferentially tries to complete the goal 142, but does not exclude other goals or units 138. The user 106 may be non-responsive to a prompt and instead ask for information more appropriately answered by another goal or by a unit 138, in which case a tangential goal or unit is returned. FIG. 2 illustrates a diagram 200 of one embodiment of an opportunistic context switching module 134 (FIG. 1). In the illustrated embodiment, the opportunistic context switching module 134 handles the scenario where the user 106 does not respond to a prompt with the information that was requested by the natural language processor 104 and instead asks a question that is unrelated to the current active goal. The user 106 may initiate an interactive dialog with the natural language processor 104, as previously discussed. The interactive dialog may result in session goals 202 comprising one or more primary goals $202_1$ to $202_n$, where n is an integer. Often times, the user 106 will not respond to the prompt from the language processor 104 with the information that was requested. Instead, the user 106 may ask a question that is unrelated to one of the primary goals $202_{1-n}$ at hand at which time the opportunistic context switching module 134 initiates the tangential request and will delay activity related to the primary goal. As shown in the illustrated diagram 200, by way of example and not limitation, the primary goal $202_2$ is active and has captured two variables, variable 1 and variable 4, which are complete. The primary goal $202_2$ has three unknown variables, variable 2 (in progress), variable 3 (unknown), and variable m (unknown). The primary goal $202_2$ has prompted the user 106 for information related to variable 2. In this example, variable 2 is not yet determined because the user 106 responded to the prompt with an unrelated natural language input. Hence, variable 2 is labeled "unknown." Since the user 106 is non-responsive to the prompt and instead asks for information more appropriately answered by another goal 142 or by a unit 138 (FIG. 1), the opportunistic context switching module 134 redirects the dialog to the tangential goal or unit. Upon completion of the tangential request, the opportunistic context switching module 134 returns the user 106 to the primary goal $202_2$.

It will be appreciated by those skilled in the art that typical information retrieval engines are generally unable to process such tangent requests 208 or goals in general. The natural language processor 104 (FIG. 1), however, is able to deal with such tangents by "shelving" the current goal $202_2$, and beginning to work on completing a new goal. Tangential requests may be initiated by either the user 106 or the natural language processor 104. Once the new goal is complete, the natural language processor 104 will switch back to a previously uncompleted goal and will continue where it left off, trying to fill in missing slot information. Opportunistic context switching enables sophisticated interactive dialogs between the user 106 and the natural language processor 104 such as the following:

> System: How many tickets would you like to buy? (Current goal: book a flight)
> User: Do I have to purchase a ticket for my infant? (Not a direct answer to the system's prompt.)
> System: How old is the child? (New goal: determine age of child) User: 12 months old
> System: Children under 24 months do not require a separate ticket. (New goal complete.)
> System: How many tickets would you like to buy? (Back to original goal.)

Figure 3:
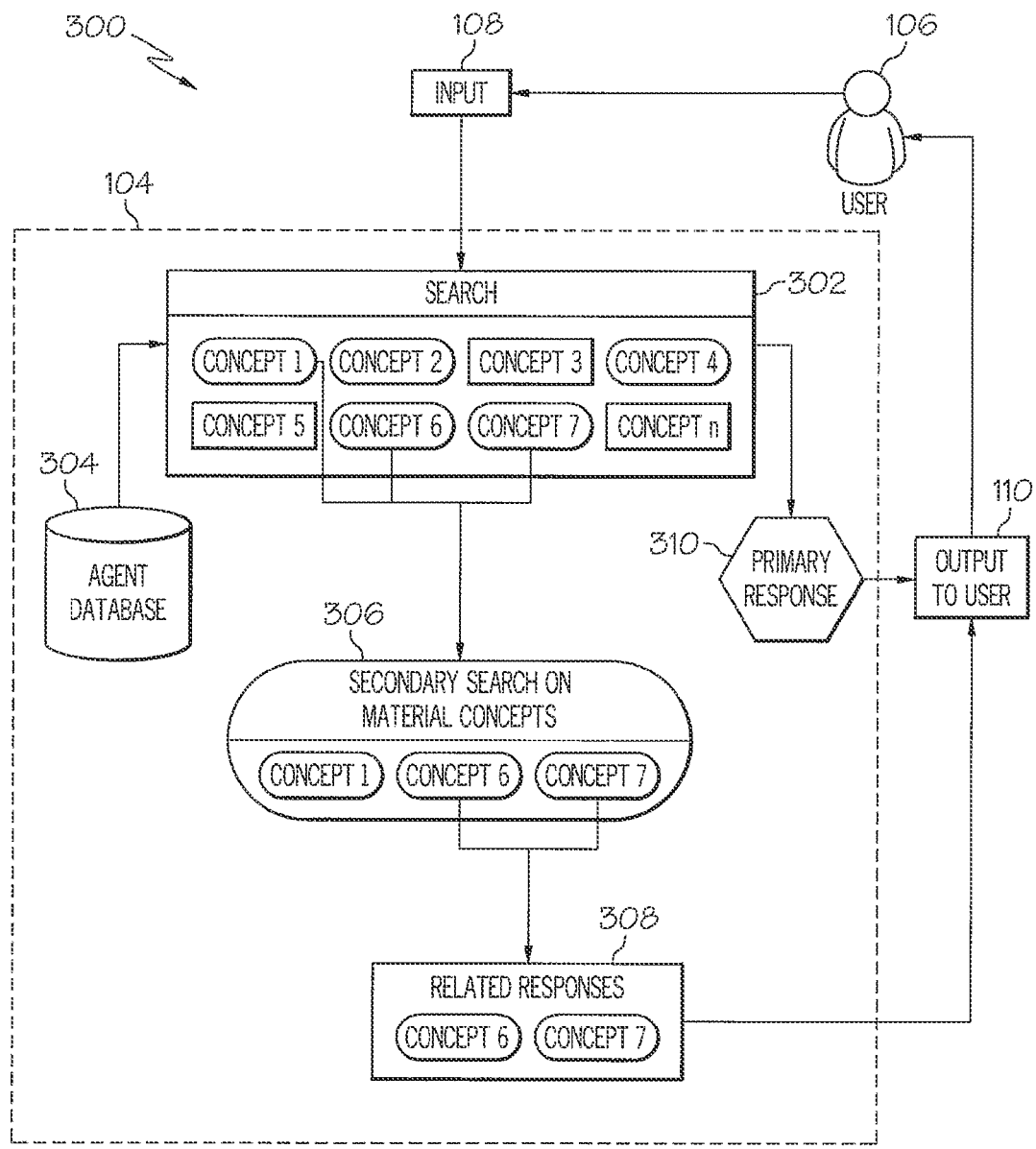
FIG. 3 illustrates a diagram of one embodiment of a meta search module.

FIG. 3 illustrates a diagram 300 of one embodiment of the meta search module 130 (FIG. 1). In the illustrated embodiment, the meta search module 130 is for providing additional related information in response to an input pattern provided in the natural language input 108 by the user 106. The meta search based natural language processing technique enables the natural language processor 104 to provide multiple responses, e.g., a primary response 310 and a related response 308, which together form the response 110 back to the user 106 rather than providing only a single response to the user 106. Accordingly, the response 110 that is associated with the unit 138 (FIG. 1) whose input pattern was matched by the user's natural language input 108 pattern. The meta search based natural language processing technique allows the natural language processor 104 to provide additional related information in the response 110 to the natural language input 108 pattern submitted by the user 106 (e.g., Here is more information you may be interested in . . . "). Without the meta search based natural language processing technique, the natural language processor 104 will provide only a single response 110 to the user—the response 110 that is associated with the unit 138 whose input pattern was matched by the user's natural language input 108 pattern.

Once the user 106 submits a natural language input 108, the natural language processor 104 initiates a primary search 302 to search for concepts 140 (FIG. 1) in an agent database 304. The meta search based natural language processing technique then performs a secondary search 306 across all the units 138 (FIG. 1) using only the "material" concepts that were found in the user's natural language input 108 pattern. This allows the natural language processor 104 to locate the units 138 which did not perfectly match the original natural language input 108 pattern, but which contains the important concepts 140 from the natural language input 108 pattern, thus allowing the natural language processor 104 to provide additional related responses 308 to the user 106. The natural language processor 104 provides the additional related responses 308 information in response to the natural language input 108 pattern submitted by the user 106, e.g., "here is more information you may be interested in . . . " as previously discussed, the primary response 310 and the additional related responses 308 together form the response 110 back to the user 106.

Figure 4:
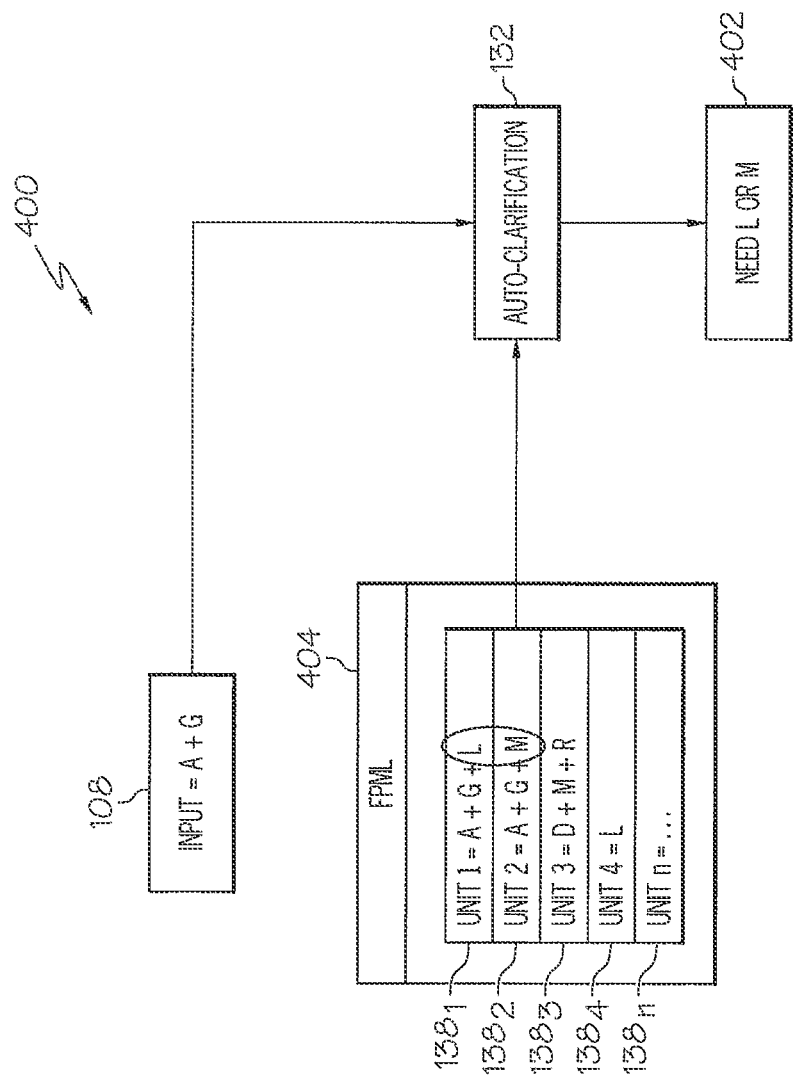
FIG. 4 illustrates a diagram of one embodiment of an auto-clarification module.

FIG. 4 illustrates a diagram 400 of one embodiment of the auto-clarification module 132 (FIG. 1). In the illustrated embodiment, the auto-clarification module 132 is for resolving ambiguities that arise when the concepts 140 found in a natural language input 108 pattern submitted by the user 106 (FIG. 1) are not sufficient for the natural language processor 104 to identify a single matching unit 138 (FIG. 1) upon which to base a response 110 to the user 106. Accordingly, as shown in FPML block 404, multiple matching units 138$_1$ to 138$_n$ may be created. For example, assume that a first matching unit 138$_1$ "Unit 1" contains concepts 140 "A," "G," and "L," and a second matching unit 1382 "Unit 2" contains concepts 140 "A," "G," and "M." If the natural language input 108 submitted by the user 106 provides only the concepts 140 "A" and "G," the natural language processor 104 will prompt 402 the user 106 for clarification—either the concept 140 "L" or "M."

Figure 5:
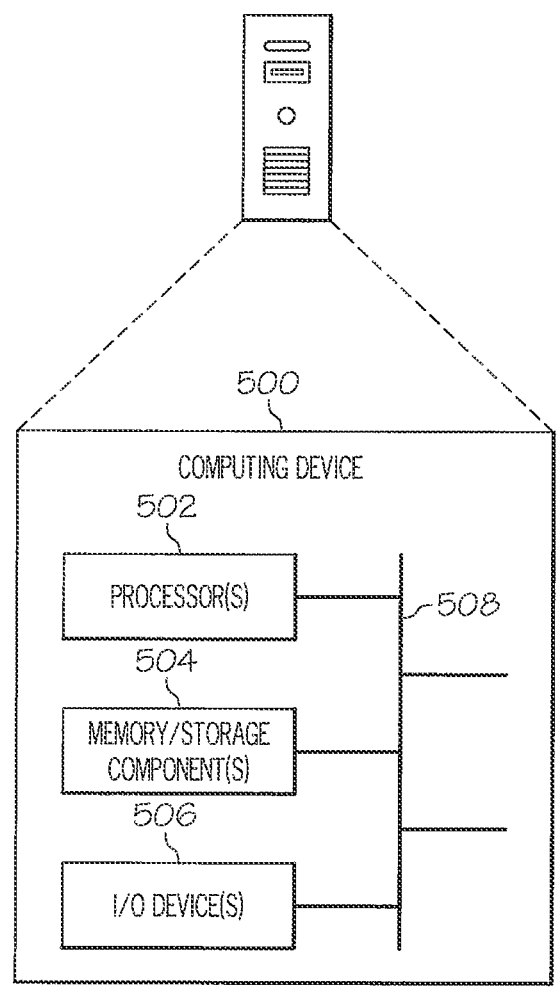
FIG. 5 illustrates one embodiment of a computing device which can be used in one embodiment of a system.

FIG. 5 illustrates one embodiment of a computing device 500 which can be used in one embodiment of a system to implement the various described embodiments. The computing device 500 may be employed to implant one or more of the computing devices, such as the natural language processor 104 described above with reference to FIGS. 1-4, or any other suitably configured computing device. For the sake of clarity, the computing device 500 is illustrated and described here in the context of a single computing device. However, it is to be appreciated and understood that any number of suitably configured computing devices can be used to implement a described embodiment. For example, in at least some implementations, multiple communicatively linked computing devices are used. One or more of these devices can be communicatively linked in any suitable way such as via one or more networks. One or more networks can include, without limitation: the Internet, one or more local area networks (LANs), one or more wide area networks (WANs) or any combination thereof.

In this example, the computing device 500 comprises one or more processor circuits or processing units 502, one or more memory circuits and/or storage circuit component(s) 504 and one or more input/output (I/O) circuit devices 506. Additionally, the computing device 500 comprises a bus 508 that allows the various circuit components and devices to communicate with one another. The bus 508 represents one or more of any of several types of bus structures, including a memory bus or memory controller, a peripheral bus, an accelerated graphics port, and a processor or local bus using any of a variety of bus architectures. The bus 508 may comprise wired and/or wireless buses.

The processing unit 502 may be responsible for executing various software programs such as system programs, applications programs, and/or modules to provide computing and processing operations for the computing device 500. The processing unit 502 may be responsible for performing various voice and data communications operations for the computing device 500 such as transmitting and receiving voice and data information over one or more wired or wireless communications channels. Although the processing unit 502 of the computing device 500 is shown in the context of a single processor architecture, it may be appreciated that the computing device 500 may use any suitable processor architecture and/or any suitable number of processors in accordance with the described embodiments. In one embodiment, the processing unit 502 may be implemented using a single integrated processor.

The processing unit 502 may be implemented as a host central processing unit (CPU) using any suitable processor circuit or logic device (circuit), such as a as a general purpose processor. The processing unit 502 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 502 may be coupled to the memory and/or storage component(s) 504 through the bus 508. The memory bus 508 may comprise any suitable interface and/or bus architecture for allowing the processing unit 502 to access the memory and/or storage component(s) 504. Although the memory and/or storage component(s) 504 may be shown as being separate from the processing unit 502 for purposes of illustration, it is worthy to note that in various embodiments some portion or the entire memory and/or storage component(s) 504 may be included on the same integrated circuit as the processing unit 502. Alternatively, some portion or the entire memory and/or storage component(s) 504 may be disposed on an integrated circuit or other medium (e.g., hard disk drive) external to the integrated circuit of the processing unit 502. In various embodiments, the computing device 500 may comprise an expansion slot to support a multimedia and/or memory card, for example.

The memory and/or storage component(s) 504 represent one or more computer-readable media. The memory and/or storage component(s) 504 may be implemented using any computer-readable media capable of storing data such as volatile or non-volatile memory, removable or non-removable memory, erasable or non-erasable memory, writeable or re-writeable memory, and so forth. The memory and/or storage component(s) 504 may comprise volatile media (e.g., random access memory (RAM)) and/or nonvolatile media (e.g., read only memory (ROM), Flash memory, optical disks, magnetic disks and the like). The memory and/or storage component(s) 504 may comprise fixed media (e.g., RAM, ROM, a fixed hard drive, etc.) as well as removable media (e.g., a Flash memory drive, a removable hard drive, an optical disk). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 506 allow a user to enter commands and information to the computing device 500, and also allow information to be presented to the user and/or other components or devices. Examples of input devices include a keyboard, a cursor control device (e.g., a mouse), a microphone, a scanner and the like. Examples of output devices include a display device (e.g., a monitor or projector, speakers, a printer, a network card). The computing device 500 may comprise an alphanumeric keypad coupled to the processing unit 502. The keypad may comprise, for example, a QWERTY key layout and an integrated number dial pad. The computing device 500 may comprise a display coupled to the processing unit 502. The display may comprise any suitable visual interface for displaying content to a user of the computing device 500. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 502 may be arranged to provide processing or computing resources to the computing device 500. For example, the processing unit 502 may be responsible for executing various software programs including system programs such as operating system (OS) and application programs. System programs generally may assist in the running of the computing device 500 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, or other suitable OS in accordance with the described embodiments. The computing device 500 may comprise other system programs such as device drivers, programming tools, utility programs, software libraries, application programming interfaces (APIs), and so forth.

Various embodiments have been set forth which provide information retrieval techniques for reducing both the number of misses and the number of false alarms when searching for documents in a knowledge base. Various embodiments of language processing techniques have been set forth for searching and retrieving documents based on a natural language input. Such natural language processing techniques provide specific answers to queries submitted by a user while avoiding the need for the user to sort through a set of search results such as might be provided by standard keyword-based searches. Various embodiments of natural language processing techniques have been set forth for improving the efficiency of accessing knowledge bases.

Various embodiments may be described herein in the general context of computer executable instructions, such software, program modules, components, being executed by a computer. Generally, program modules include any software element arranged to perform particular operations or implement particular abstract data types. Software can include routines, programs, objects, components, data structures and the like that perform particular tasks or implement particular abstract data types. An implementation of these modules or components and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, program modules may be located in both local and remote computer storage media including memory storage devices.

Although some embodiments may be illustrated and described as comprising functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

It also is to be appreciated that the described embodiments illustrate example implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the embodiments.

What is claimed is:

1. A method comprising:
   causing a virtual agent to be output to facilitate an interactive session between the virtual agent and a user;
   receiving initial user input during the interactive session;
   processing the initial user input to determine components for the initial user input and a pattern of the components, the pattern of the components including at least one of an order of the components or a proximity of the components to each other, each of the components relating to a term in the initial user input;
   determining a concept of the initial user input based at least in part on the pattern of the components;
   ending the interactive session between the virtual agent and the user;
   starting a subsequent interactive session between the virtual agent and the user;
   receiving additional user input during the subsequent interactive session;
   using the concept of the initial user input to determine a response for the additional user input; and
   causing the virtual agent to output the response for the additional user input.

2. The method of claim 1, further comprising:
   determining that the additional user input is ambiguous user input;
   wherein the response for the additional user input is determined in response to determining that the additional user input is ambiguous user input.

3. The method of claim 2, further comprising:
   determining a meaning of the additional user input by causing the virtual agent to prompt the user for further user input.

4. The method of claim 1, wherein the determining the concept of the initial user input is further based at least in part on data related to the user.

5. The method of claim 1, further comprising:
   facilitating a goal-based dialogue between the virtual agent and the user to identify and accomplish a goal.

6. The method of claim 1, further comprising:
   clarifying ambiguous input of the user by causing the virtual agent to prompt the user for user input.

7. The method of claim 1, wherein the additional user input comprises ambiguous user input that is associated with multiple concept-based units, each of the multiple concept-based units mapping a concept to a response.

8. The method of claim 1, further comprising:
   identifying a goal associated with the initial user input; and
   causing an interactive dialog to be initiated between the virtual agent and the user to acquire information for the goal.

9. One or more non-transitory computer-readable media having computer-readable instructions thereon which, when executed by one or more processors, cause the one or more processors to perform operations comprising:
   enabling an interactive session between a virtual agent and a user;
   receiving user input during the interactive session;
   determining a concept of the user input;
   starting a subsequent interactive session between the virtual agent and the user;
   receiving ambiguous user input during the subsequent interactive session between the virtual agent and the user;
   determining a meaning of the ambiguous user input based at least in part on the concept of the user input;
   determining a response for the ambiguous user input based at least in part on the meaning of the ambiguous user input; and
   causing the virtual agent to provide the response.

10. The one or more non-transitory computer-readable media of claim 9, wherein the concept is based at least in part on clarifying information that is obtained from the user.

11. The one or more non-transitory computer-readable media of claim 9, wherein the concept is based at least in part on a goal-based dialogue between the virtual agent and the user.

12. The one or more non-transitory computer-readable media of claim 9, wherein the concept is based at least in part on healthcare vocabulary.

13. The one or more non-transitory computer-readable media of claim 9, wherein the concept represents a pattern of components of the user input, the pattern of components comprising a pattern of one or more of:
a vocab term comprising at least one of a grouping of unambiguous synonyms of a term in the user input or a grouping of spelling variations of a term in the user input;
a helper term comprising a conjunction in the user input; or
a wild card comprising a placeholder for a term in the user input.

14. The one or more non-transitory computer-readable media of claim 9, wherein the determining the meaning of the ambiguous user input includes determining that a term of the ambiguous user input has a same meaning as a term of previous user input.

15. The one or more non-transitory computer-readable media of claim 9, wherein the operations further comprise:
in response to determining the meaning of the ambiguous user input, storing the meaning of the ambiguous user input in memory; and
maintaining the meaning of the ambiguous user input in the memory during the subsequent interactive session between the virtual agent and the user.

16. The one or more non-transitory computer-readable media of claim 9, wherein the operations further comprise:
identifying a goal associated with the ambiguous user input;
assigning a goal variable to be used to complete the identified goal;
receiving a tangential request that is unrelated to the identified goal;
processing the tangential request; and
returning to the goal variable.

17. The one or more non-transitory computer-readable media of claim 9, wherein the causing the virtual assistant to provide the response comprises sending the response to a computing device for output via the computing device.

18. The one or more non-transitory computer-readable media of claim 9, wherein the causing the virtual assistant to provide the response comprises outputting the response via a computing device.

19. A system comprising:
one or more processors; and
memory communicatively coupled to the one or more processors and storing executable instructions that, when executed by the one or more processors, cause the one or more processors to perform operations comprising:
causing a virtual agent to be output to facilitate a conversation with a user;
identifying a first goal to be accomplished, the first goal being associated with multiple variables;
receiving natural language input of the user;
determining that information for a variable of the multiple variables is missing;
causing the virtual agent to prompt the user for the information that is missing;
receiving additional natural language input;
determining that the additional natural language input relates to a second goal, distinct from the first goal;
performing a task related to the second goal; and
causing the virtual agent to return to the first goal and prompt the user again for the information that is missing for the first goal.

20. The system of claim 19, wherein the operations further comprise:
determining that the natural language input is associated with multiple meanings; and
determining a meaning of the natural language input based at least in part on a concept of previously received natural language input.

21. The system of claim 19, wherein the operations further comprise determining the information that is missing based at least in part on context of the conversation.

22. The system of claim 19, wherein the operations further comprise:
Identifying another goal to be completed to complete the first goal; and
Prompting the user for information related to the another goal.

23. A system comprising:
one or more processors; and
memory communicatively coupled to the one or more processors and storing executable instructions that, when executed by the one or more processors, cause the one or more processors to perform operations comprising:
causing a virtual agent to be output to facilitate an interactive session between the virtual agent and a user;
receiving initial user input during the interactive session;
processing the initial user input to determine components for the initial user input and a pattern of the components, the pattern of the components including at least one of an order of the components or a proximity of the components to each other, each of the components relating to a term in the initial user input;
determining a concept of the initial user input based at least in part on the pattern of the components;
ending the interactive session between the virtual agent and the user;
starting a subsequent interactive session between the virtual agent and the user;
receiving additional user input during the subsequent interactive session;
using the concept of the initial user input to determine a response for the additional user input; and
causing the virtual agent to output the response for the additional user input.

24. The system of claim 23, wherein the operations further comprise:
determining that the additional user input is ambiguous user input;
wherein the response for the additional user input is determined in response to determining that the additional user input is ambiguous user input.

25. The system of claim 23, wherein the additional user input comprises ambiguous user input that is associated with multiple concept-based units, each of the multiple concept-based units mapping a concept to a response.

26. A system comprising:
one or more processors; and
memory communicatively coupled to the one or more processors and storing executable instructions that, when executed by the one or more processors, cause the one or more processors to perform operations comprising:
enabling an interactive session between a virtual agent and a user;
receiving user input during the interactive session;
determining a concept of the user input;
starting a subsequent interactive session between the virtual agent and the user;
receiving ambiguous user input during the subsequent interactive session between the virtual agent and the user;
determining a meaning of the ambiguous user input based at least in part on the concept of the user input;
determining a response for the ambiguous user input based at least in part on the meaning of the ambiguous user input; and
causing the virtual agent to provide the response.

27. The system of claim 26, wherein the determining the meaning of the ambiguous user input includes determining that a term of the ambiguous user input has a same meaning as a term of previous user input.

28. The system of claim 26, wherein the operations further comprise:
in response to determining the meaning of the ambiguous user input, storing the meaning of the ambiguous user input in the memory; and
maintaining the meaning of the ambiguous user input in the memory during the subsequent interactive session between the virtual agent and the user.

* * * * *